US008036258B2

(12) United States Patent
Alkhatib et al.

(10) Patent No.: US 8,036,258 B2
(45) Date of Patent: Oct. 11, 2011

(54) METHOD AND SYSTEM FOR INCREASING TRANSMISSION SPEED OF WIRED OR WIRELESS SIGNALS WHILE MINIMIZING THE BIT ERROR RATE

(76) Inventors: Mazen Alkhatib, Mobile, AL (US); Mohammad Alam, Mobile, AL (US)

( * ) Notice: Subject to any disclaimer, the term of this patent is extended or adjusted under 35 U.S.C. 154(b) by 1028 days.

(21) Appl. No.: 11/975,016

(22) Filed: Oct. 17, 2007

(65) Prior Publication Data
US 2009/0103638 A1   Apr. 23, 2009

(51) Int. Cl.
    *H03B 1/38*   (2006.01)
(52) U.S. Cl. .................................................. 375/219
(58) Field of Classification Search .............. 375/219, 375/254, 285, 295, 296, 324, 340, 346, 348
    See application file for complete search history.

(56) References Cited

U.S. PATENT DOCUMENTS

| 6,624,822 B2 * | 9/2003 | Hayashi et al. ............... 345/605 |
| 7,257,163 B2 | 8/2007 | Hwang et al. |
| 7,600,164 B2 * | 10/2009 | Chen ............................ 714/701 |
| 2007/0053422 A1 * | 3/2007 | Kisovec et al. ............... 375/239 |

* cited by examiner

*Primary Examiner* — Chieh M Fan
*Assistant Examiner* — Jaison Joseph
(74) *Attorney, Agent, or Firm* — David M. Giglio (57) ABSTRACT

A communication system is provided which offers increased transmission speed while maintaining a low bit error rate. At the transmitter, a digital input is entered and a microprocessor determines from a particular subset of pulse sequence codes a single sequence of pulse coefficients that corresponds to that particular digital input. The sequence of pulse coefficients are then multiplied by a pulse shape, modulate and transmitted. At the receiver, the modulated pulses are demodulated. The demodulated pulses are then, on a pulse by pulse basis, subtracted from each of the subset of pulse sequences with the absolute values of each pulse for each pulse sequence being summed. A comparator selects a sequence of pulse coefficients corresponding to the lowest summed value of a particular pulse sequence, which is then mapped to a digital signal which is the same digital signal as the digital input.

23 Claims, 7 Drawing Sheets

TRANSMITTER

PRIOR ART

FIG. 1

RECEIVER

PRIOR ART

METHOD AND SYSTEM FOR INCREASING TRANSMISSION SPEED OF WIRED OR WIRELESS SIGNALS WHILE MINIMIZING THE BIT ERROR RATE

FIELD OF THE INVENTION

The present invention relates generally to the field of communications and, more particularly, to a method and apparatus for increasing the speed and decreasing the bit error rate for digital communications.

BACKGROUND OF THE INVENTION

In the field of digital communications researchers are constantly striving for methods to increase data transmission rate and reduce bit error probabilities (BEP). Traditionally, digital inputs are carried on a high frequency sinusoidal analog signal (called the carrier signal) via modulation by using a suitable mixing circuit. The resulting modulated signal is then transmitted through known means to a receiver. At the receiver, a mixing circuit demodulates the received signal by using a high frequency sinusoidal wave and a suitable filter to retrieve the originally transmitted digital input signals.

One problem encountered during the transmission process is that intersymbol interference (ISI) and Gaussian noise are added to the received signal which causes the received signal to differ from the transmitted signal, thereby causing transmission errors. Thus, the probabilities of error in the presence of ISI and Gaussian noise is dramatically increased.

Generally speaking, bit errors are calculated according to a following generalized example. Consider a word of M bits $\{b_0, b_1, \ldots b_{M-1}\}$ to be mapped to a pulse series consisting of signals $S_k g_k$, where $s_k \in \{-1, 0, +1\}$ is the $k_{th}$ pulse coefficient and $g_k$ is the $k_{th}$ pulse. The result of mapping the M bits yields the pulse series $\{S_0 g(t), S_1 g(t-TB), \ldots, S_{M-1} g(t-(M-1)TB)\}$, where TB represents the bit time. If M=2 then the resulting probability of error is worse than the corresponding probability for a classical binary case (M=2) and each bit is mapped to either $-g(t)$ or $+g(t)$. The received signal at time $t-iTB$ is expressed as:

$$Y(t-iTB)=n+S_1 g(t-iTB)+\Sigma S_k g(t-kTB) \text{ where } (-\infty<k<\infty, k\neq i) \quad (1)$$

where n represents the Gaussian additive noise and $\Sigma S_k g(t-kTB)$ from $k=-\infty$ to $\infty$, with the exception of $k=i$ represents the ISI term. Assume that Z represents the ISI, and $X=n+Z$, then $$Y_i = S_i g_i + x \quad (2)$$

where t and TB are omitted for notational economy. For a received signal Yi, the probability of correct decision regarding pulse coefficient Si conditioned on Z can be expressed as $$Pc|_z = P(S_i=-1)P(-g_i+X<g_i/2) + P(S_i=0)P(-g_i/2<X<+g_i/2) + P(S_i=+1)P(g_i+X>g_i/2) \quad (3)$$

Assume that X is symmetrical around zero [4], and using $P(n+Z<+gi/2)=1-P(n+Z>+gi/2)$, and since $$P(-gi/2<n+Z<+gi/2)=1-P(n+Z<-gi/2)-P(n+Z>+gi/2)=1-2P(n+Z>+gi/2) \quad (4)$$

and $$P(n+Z<+gi/2)=1-P(n+Z>+gi/2) \quad (5)$$

then Eq. (3) may be rewritten as $$Pc|_z = P(S_i=-1)(1-p(N+z>g_i/2)) + P(s_i=0)(1-2p(n+Z>g_i/2)) + P(S_i=+1)(1-P(n+Z>g_i/2)) \quad (6)$$

Equation (6) can be rewritten as $$Pc|_z = 1-P(n+Z>g_i/2)(P(S_i=-1)+2P(S_i=0)+P(S_i=+1)) \\ = 1=P(n>g_i/2-Z)[P(S_i=-1)+2P(S_i=0)+P(S_i=+1)] \quad (7)$$

Since the probability of error conditioned on Z is $1-P_c$ then, $$P_e(S_i|z) = G(g_i/2-Z)[P(S_i=-1)+2P(S_i=0)+P(S_i+1)] \quad (8)$$

where G(.) represents the cdf of the Gaussian noise. Assume that $C_1=[P(S_i=-1)+2P(S_i=0)+P(S_i=+1)]$, and $f_z(z)$ represents the pdf of the random variable Z, then $Pe(S_i)$ can be expressed as $$Pe(S_i) = C_1 \int f_z(Z) G(g_i/2-Z) dZ \quad (9)$$

For M=2, any error in $S_0$ or $S_1$ will result in a symbol error. A symbol error may result either in two bit error or in one bit errors. Since the probability of having one error bit is twice the probability of having two error bits within a symbol once a symbol error occurs, then the average probability of bit error is $\frac{1}{3} Pe(S_i)$.

One approach taken to minimize ISI in U.S. Pat. No. 7,257,163 to Hwang et al is to map a cluster digital words to a single mapped word. In Hwang et al, a digital input is mapped to one of a robust set of digital golden words. The golden words are much longer than the digital input. Therefore, even though the bit error rate is acceptable, the transmission rate of Hwang is rather slow.

SUMMARY AND OBJECTS OF THE PRESENT INVENTION

It is an object of the present invention to improve the art of communications.

It is another object of the present invention to reduce bit error rate during the transmission of digital information.

It is a further object of the present invention to increase the speed of transmission of digital information while at the same time not increasing the bit error rate.

It is yet another object of the present invention to reduce the effects of intersymbol interference and Gaussian noise during transmission of digital information.

It is a feature of the present invention to utilize a trinary or greater signaling level system of mapping a binary input code for encoding and decoding.

It is a feature of the present invention to provide an algorithm which determines an optimal array of sequences of pulse coefficients in response to a digital input, such that upon decoding the signal only one of the sequence of pulse coefficients will be selected as being closely aligned to the digital input signal. The selected sequence of pulse coefficients is easily mapped back to the original digital input signal.

These and other objects and features are provided by a communications system which has a transmitter and receiver. At both the transmitter and receiver, a plurality of codes are stored into a memory at the transmitter and receiver, respectively. The codes consist of several arrays of sequences of pulse coefficients in which certain subsets of the arrays correspond to digital inputs of certain lengths.

The pulse coefficient codes can have varying lengths and magnitudes, but generally, the length of a subset of codes are typically consistent corresponding to a digital input of the same length. The pulse coefficient codes are determined by an optimization algorithm which first deselects a number of possible sequence of pulse coefficients based upon a portion of such sequences of pulse coefficients having an undesirable string of characters.

The algorithm then determines an optimum separation of the remaining sequence of pulse coefficients to determine a particular subset of pulse coefficients corresponding to a digital input of a certain length.

Different lengths in digital inputs results in the algorithm producing a unique subset of pulse coefficients for each differing length of digital input.

At the transmitter, a digital input is entered and a microprocessor determines from a particular subset of sequences of pulse coefficients a single sequence of pulse coefficients that corresponds to that particular digital input. The pulse coefficient sequence is then multiplied by a pulse shape. The multiplied shape is then modulated for transmission.

At the receiver, the modulated pulses are demodulated. The demodulated pulses are then, on a pulse by pulse basis, subtracted from each of the subset of pulse sequences at the receiver with the absolute values of each pulse for each pulse sequence being summed. A comparator selects the pulse sequence corresponding to the lowest summed value. A single sequence of pulse coefficients is selected which corresponds to the received pulse sequence. This single sequence of pulse coefficients is then mapped to a digital signal which is the same digital signal as the digital input.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 1:
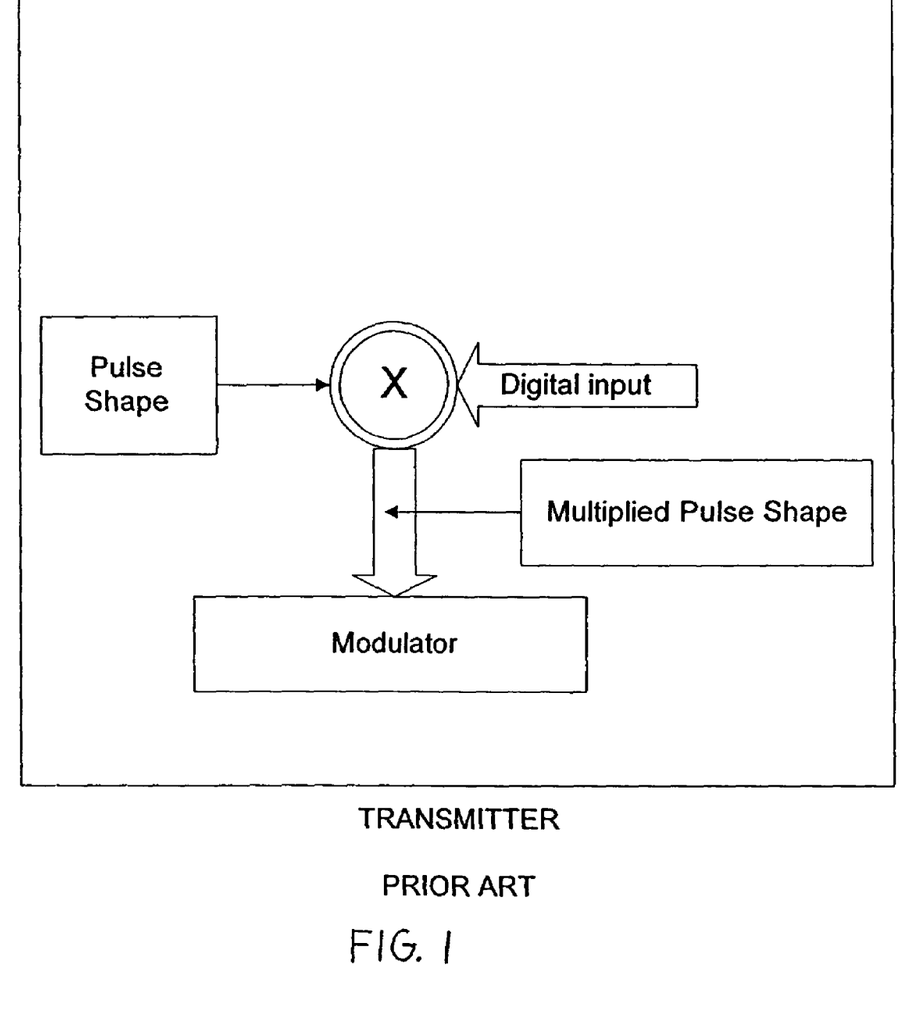
FIG. 1 is a block diagram of a transmitter as is known in the prior art.
Figure 2:
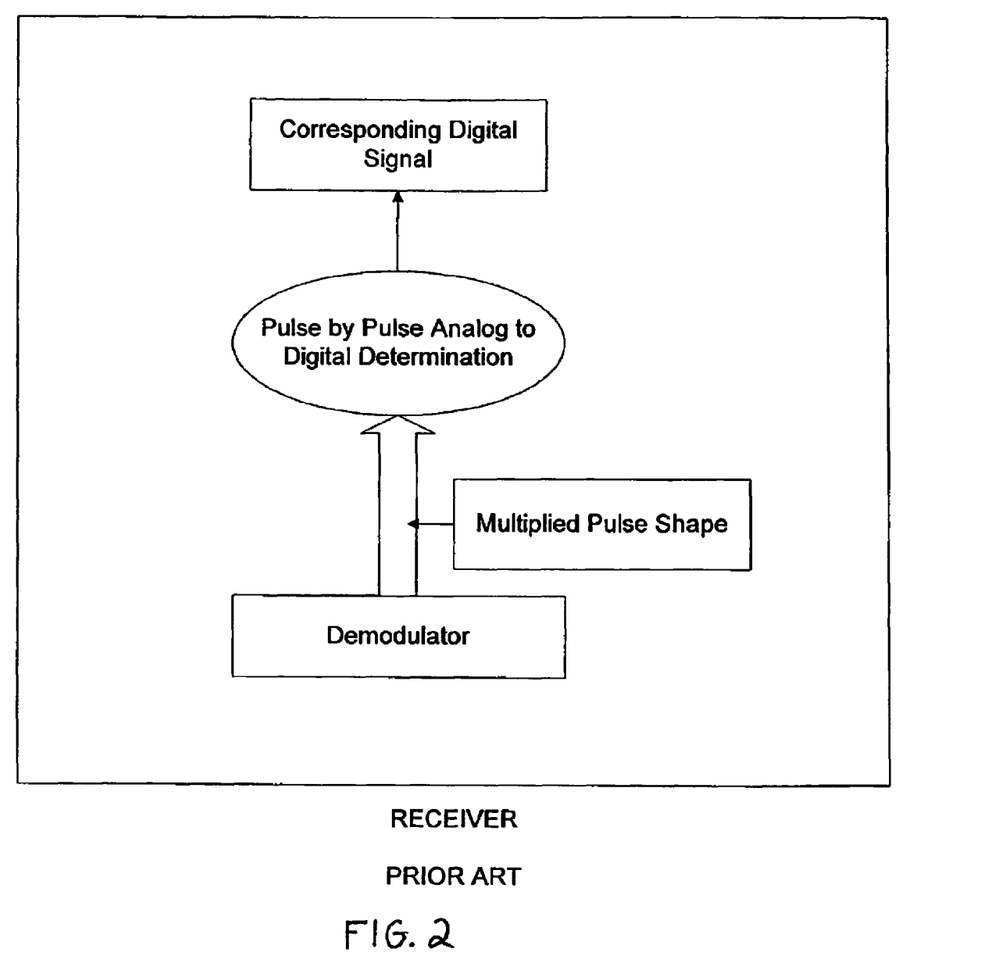
FIG. 2 is a block diagram of a receiver as is known in the prior art.

It is known in communication systems to multiply a digital input by a pulse shape and modulate the pulse shape for transmission, which is depicted as prior art in FIG. 1. At the receiver, the receiver demodulates the modulated pulses and then reconstructs the pulse shape on a pulse by pulse basis to determine the original transmitted digital input, which is depicted as prior art in FIG. 2.

Figure 3:
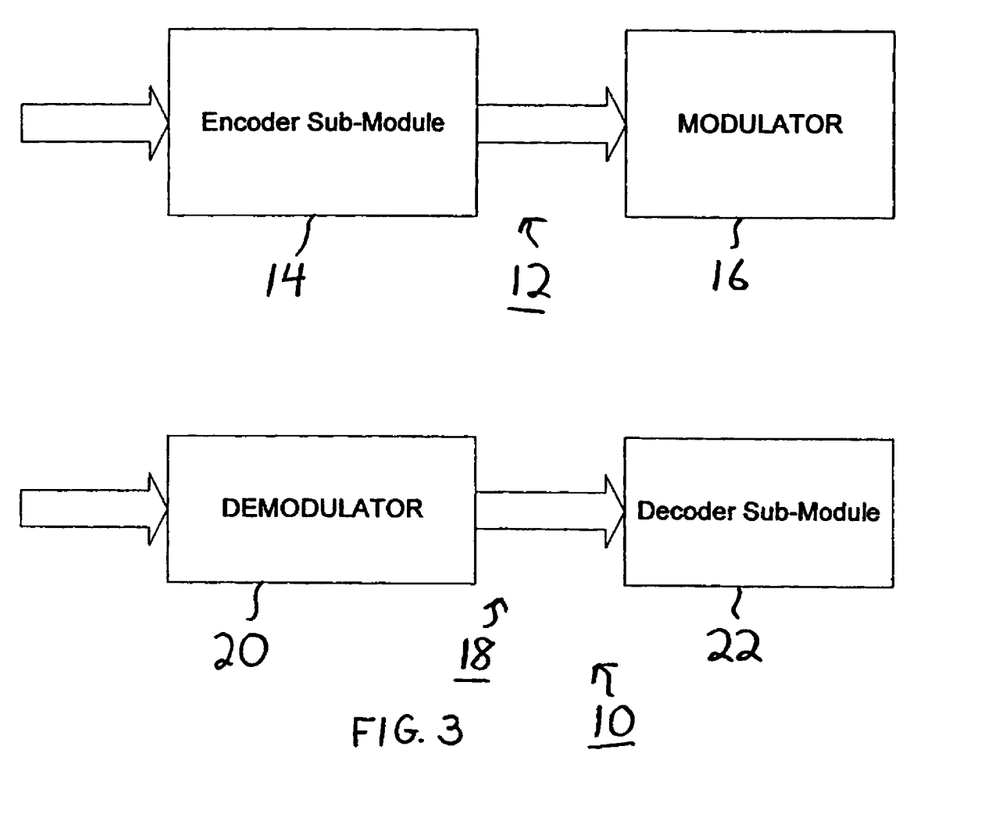
FIG. 3 is a crude block diagram showing a communication system of the present invention.

The present invention presents a system and apparatus that reduces bit error probability and enhances the transmission speed of wired or wireless radio frequency ("RF") or optical transceivers. Referring to FIG. 3, a communications system 10 in accordance with the present invention includes a novel encoder sub-module 14 which utilizes an optimization code generated by an algorithm to encode sequences of input bits into preferred sequences of electrical pulses.

At a transmitter 12 the encoder sub-module 14 uses an optimal code generated via extensive computer simulations. The optimum code consists of $M=2^N$ separate pulse coefficients, each of which corresponds to a unique digital input.

Each pulse sequence consists of N pulse signal coefficients. A pulse signal is formed by multiplying the pulse coefficient $S_j$ with a pulse shape $g_j$. At first the N bits $\{b_0, b_1, \ldots, b_{N-1}\}$ are mapped to N pulse sequence coefficients $\{S_0, S_1, \ldots, S_{N-1}\}$. Then, each pulse coefficient in the sequence is multiplied by a pulse shape $g(t-kT)$, where $k \epsilon \{0, 1, \ldots -1\}$, and T is the bit time period. The pulse shapes are represented as $\{g_0, g_1, g_{N-1}\}$. The result of the multiplication yields the pulse signals $\{S_0 g_0, S_1 g_1, \ldots, S_{N-1} g_{N-1}\}$ which are sent serially to a modulator 16 which modulates the carrier signal in the transmitter system 12.

The receiver unit 18 includes a de-modulator 20 which de-modulates the N electrical pulses. The pulses received at the receiver unit contain noise and ISI components. The pulses are represented as:

$$\{R_0 = S_0 g_0 + n_0 + ISI_0, R_1 = S_1 g_1 + n_1 + ISI_1, \ldots, R_{N-1} = S_{N-1} g_{N-1} + n_{N-1} + ISI_{N-1}\}$$

where n is the Gaussian noise added to the pulses and ISI is the intersymbol interference.

A decoder sub-module 22 compares the value of each received signal pulse to each signaling pulse generated by the corresponding stored sequence of the optimal code. Then the decoder sub-module 22, also depicted in FIG. 3, selects a single pulse sequence from a predetermined set of pulse sequences having the smallest overall difference from the received pulse sequence. A single sequence of pulse coefficients then corresponds to the received single pulse sequence.

Figure 6:
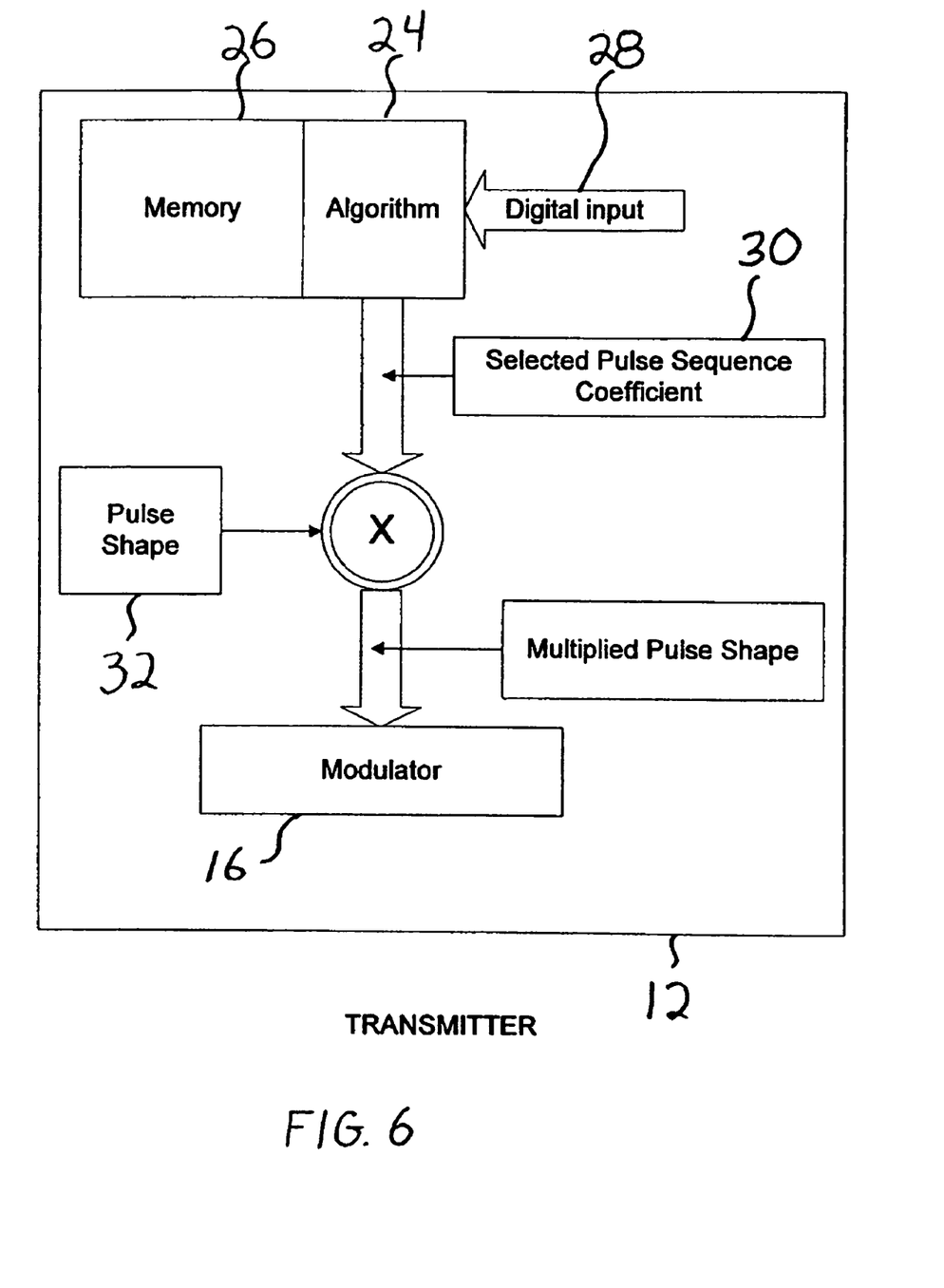
FIG. 6 is a block diagram of a transmitter in accordance with the present invention.

Referring now to FIG. 6 the transmitter 12 of the present invention shall be described. A digital input 28 is entered and an algorithm 24 selects a single sequence of pulse coefficient 30 from a set of sequences of pulse coefficients which are stored in a memory 24, based upon the particular digital input 28. The selected sequence of pulse coefficients 30 is multiplied by a pulse shape 32, modulated and then transmitted.

Figure 7:
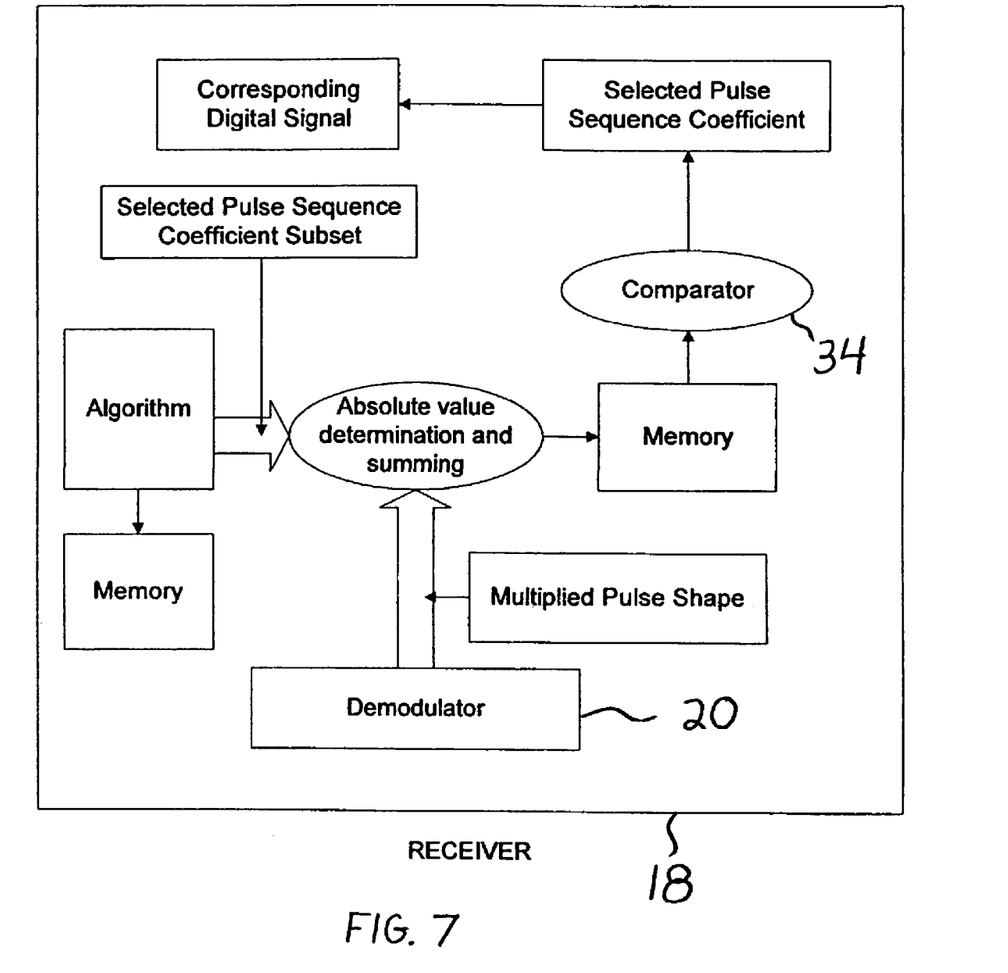
FIG. 7 is a block diagram of a receiver in accordance with the present invention.

Referring now to FIG. 7 the modulated pulse shape is demodulated at the receiver 18. The demodulated shape is then, on a pulse by pulse basis, subtracted from each of the subset of pulse sequences with the absolute values of each pulse for each pulse sequence being summed. A comparator 34 selects the pulse sequence corresponding to the lowest summed value. A single sequence of pulse coefficients corresponds to the selected pulse sequence. The single sequence of pulse coefficients is then mapped to a digital signal which is the same digital signal as the digital input.

Figure 4:
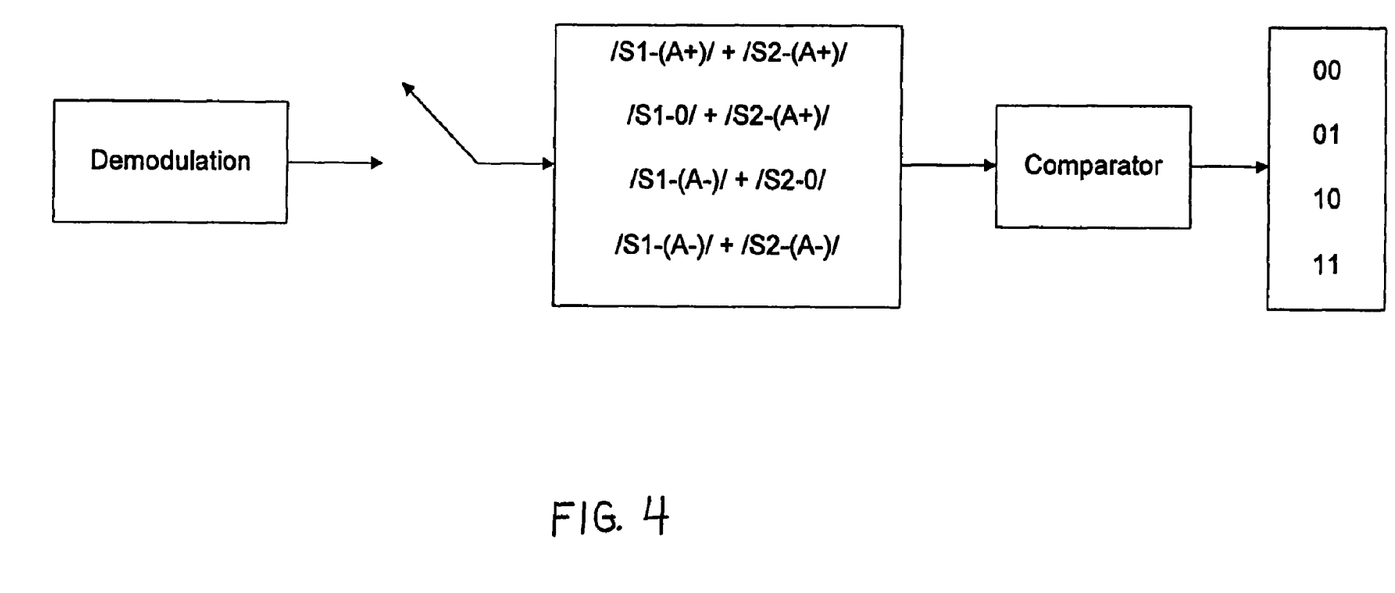
FIG. 4 is a block diagram showing a specific example of a receiver in accordance with the present invention.
Figure 5:
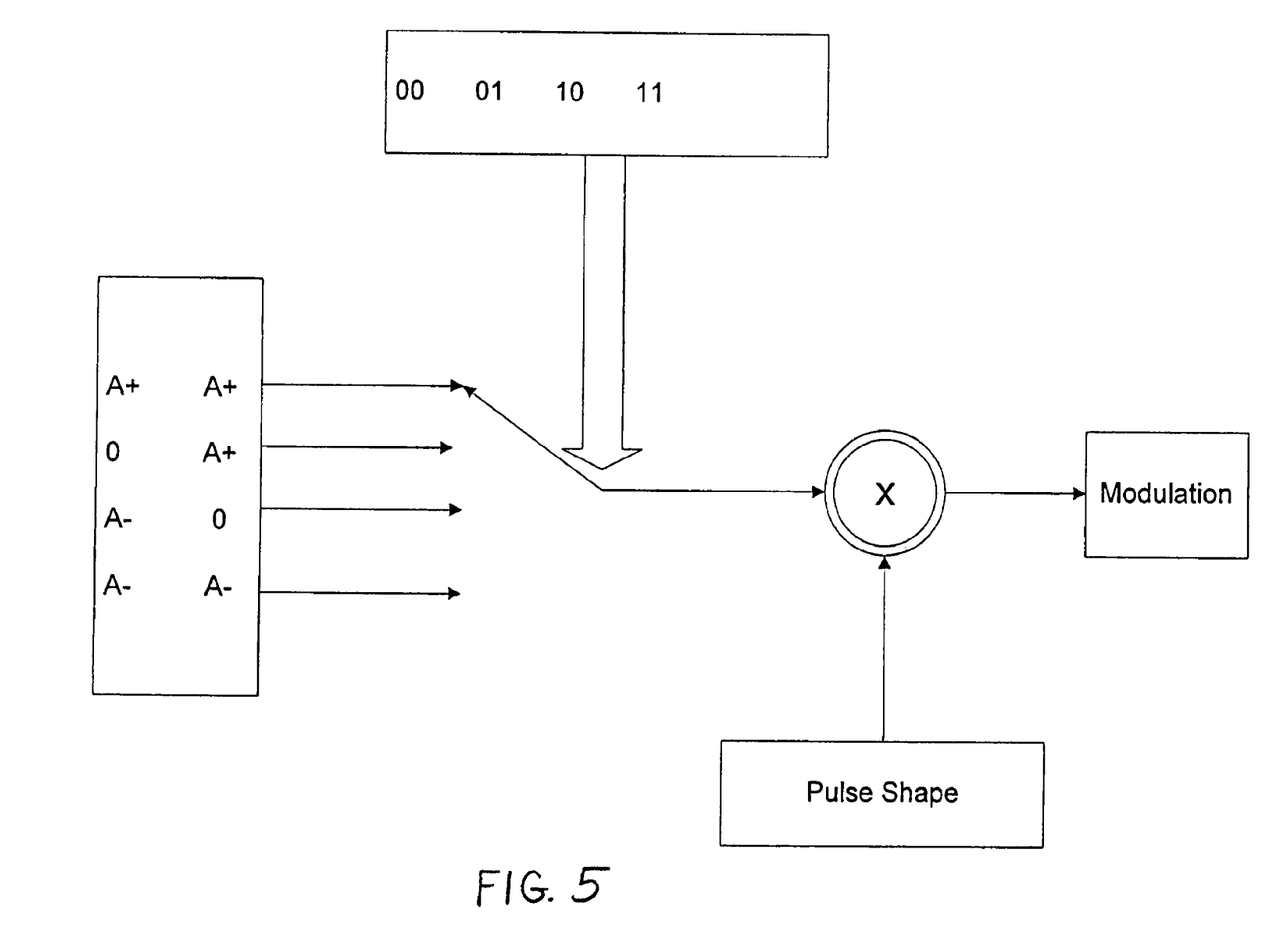
FIG. 5 is a block diagram depicting the specific example of FIG. 4 at the transmitter in accordance with the present invention.

Referring now to FIGS. 4 and 5, a simple two bit example, for illustration purposes only, of a mapping procedure of the present invention is depicted. FIGS. 4 and 5 show four possible inputs of two bit digital sequence combinations followed by nine possible pulse sequence combinations when negative amplitudes are taken into account. The four possible inputs are 00, 01, 10 and 11. The nine possible two bit sinusoidal pulse sequences are described as having coefficients of +1+1, +10, +−1, 0+1, 00, 0−1, −1+1, −10 and −1−1, respectively. As pulse amplitudes they are stored as A+A+, A+0, A+A−, 0A+, 00, 0A−, A−A+, A−0 and A−A−, where A is a predetermined amplitude multiplier.

Next, a computer algorithm selects four of the sinusoidal pulse sequences which both minimize the ISI hazard cases per sequence and maximize the free distance between selected sequences. Although FIGS. 4 and 5 depicts only a two bit mapping procedure, the same procedure can be used for mapping digital sequences involving much higher number of bits.

Turning now to a trinary system of the present invention, and referring to FIGS. 4 and 5, four selected sequences of pulse coefficients are stored at both the transmitter and receiver. FIG. 4 depicts a sequence of operation of the transmitter during mapping. The selected four stored pulse coefficients are stored in the transmitter memory. A two-bit digital input sequence is generated and detected. A controlled switch, responsive to the detected two-bit sequence, keys one of the selected pulse coefficients into an amplifier where the selected pulse coefficients are multiplied by a pulse shape. The amplified pulse shape is then modulated and transmitted.

At the receiver and referring now to FIG. 5, the transmitted pulse shape is demodulated and then sampled. When using two-pulse sequences, two samples are generated per pulse sequence. These samples with amplitudes S1 and S2, respectively, are compared to four two-pulse sequences at the receiver. The absolute value of the difference between the amplitude of S1 and the first amplitude of each of the four stored pulse sequences is determined and stored. Next, the absolute value of the difference between the amplitude of S2 and the second amplitude of each of the four stored pulse sequences is determined and stored. The absolute values of the differences between the received pulses and the stored pulses are separately summed and stored. A comparator compares the summed absolute values and selects the stored pulse sequence corresponding to the lowest summed absolute value. A single sequence of pulse coefficients corresponds to the selected pulse sequence. This single sequence of pulse coefficients is then re-mapped back to the original bit sequence.

The optimum code pulse sequences are determined prior to transmission. A detailed computer simulation program searches for the optimum pulse sequences which provides the lowest bit error probability during transmission. The lowest bit error probability generally occurs when the differences are the greatest between the pulse sequences of the optimum code.

For two-bit inputs, the pulse sequences consist of four possibilities in binary systems and nine possibilities in trinary systems. For nineteen bit inputs the pulse sequences consist of 524,288 possible sequences in binary systems. It should also be noted that systems having pulse sequences with greater than trinary code may also be used.

All of these possible pulse sequences, also referred to as codes are simulated using advanced object oriented language, with the code that achieves the lowest bit error probability being selected as the optimum code.

The simulated algorithm may generate codes with different sequence lengths (no. of pulse coefficients per sequence). There is no limit to the sequence lengths that can be generated. At least one of the codes generated achieves 20% transmission speed up while maintaining a probability of error of less than $10^{-8}$. Comparing the performance of at least one of the invented codes with VDSL2 performance, a speed of up to 130% is achieved while maintaining a probability of error less than $10^{-8}$.

Pulse coefficients are selected from the set: $S_j \in \{0, \alpha_1 A, \alpha_2 A, \alpha_{(L-1)} A\}$, where L indicates the number of signaling levels, and $\alpha_1, \alpha_2, \ldots, \alpha_{(L-1)}$ represents the factors that determine the amount of separation between adjacent signaling levels (or pulse coefficients) which can be positive or negative. The common term A is a base voltage level separation unit.

Where three signaling levels, $S_k \in \{0, \alpha_1 A, \alpha_2 A\}$, are used such as in optical communications systems, the laser diode at the transmitter generates pulse signals in the form of $\{0, \alpha_1 A_{gj}, \alpha_2 A_{gj}\}$. The zero voltage level turns off the laser diode, thereby making the optical power output equal to zero.

The $\alpha_1 A_{gj}$ or $\alpha_2 A_{gj}$ voltage levels generate laser diode base currents of $I_{\alpha_1}$ or $I_{\alpha_2}$ respectively, causing the output power to be P1 or P2 respectively.

To illustrate the generation of the optimum code, assume that $\alpha_1$ and $\alpha_2$ are set to 1 and 2 respectively in a trinary signaling level system (L=3). The code sequences are composed of pulses which take values from the set $S_j \in \{0, A, 2A\}$. In certain sequences of pulse coefficients, certain pulses followed by other types of pulses consistently result in the reception of intersymbol interference (ISI) components between the adjacent signaling pulses. If the level of ISI and noise imposed on the zero coefficient pulse exceed the threshold $V_{th1}$, then the receiver makes an erroneous decision based on the value of the received pulse coefficient when hard decision decoding is used. These aforementioned pulse sequences are considered hazardous and a potential ISI threat that should be prevented as much as possible.

The optimum code searching algorithm eliminates or minimizes the number of hazardous cases per code sequence.

When return-to-zero (RZ) coding is used in optical communications systems the effect of ISI is reduced, especially where the duty cycle is small such as 33%. However, as the data rate increases and the normalized electrical bandwidth $b_e = B_e/R$ (where $B_e$ is the bandwidth of the receiver electronics and R is the data rate) of the receiver becomes 0.5 or less, the BEP performance degrades dramatically.

When the ratio D of bit duration T to pulse duration $T_p$ increases, the BEP performance improves. When the data rate is increased causing $b_e$ to fall below 0.5, the BEP performance deteriorates for all values of D.

In order to generate a new code to reduce ISI effect, the optimum code searching algorithm utilizes certain criteria.

The number of pulse coefficient sequences per code is $M=2 \uparrow N$. Each coefficient within a pulse code series is selected from the set of $\{0, \alpha_1 A, \alpha_2 A\}$ for a three level signaling system and from the set of $\{0, \alpha_1 A, \alpha_2 A, \alpha_3 A\}$ for a four level signaling system.

It is desirable that the percentage of zero coefficients should be as high as possible, while the percentage of other than zero pulse coefficients should be as equal as possible for each type.

All ISI hazard cases should be prevented as much as possible. Certain patterns within a sequence of pulse coefficients are hazardous and thus, should be prevented as much as possible. Pulse code series ending with certain strings of pulse coefficients are not allowed. Further, pulse code series starting with certain pulse coefficients are also not allowed.

The optimization program should deselect the hazardous sequence of pulse coefficients immediately to avoid intersymbol interference.

Finally, the sequence free distance (FD) separation should be maximized between sequences of pulse coefficients in the selected code so that adjacent sequences of pulse coefficients achieve maximum separation.

It is not necessary to map a digital bit sequence having N terms to pulse sequence having N pulse coefficients. In fact, it is often more desirable to have a pulse sequence having a greater number of pulse coefficients than the number of digital bits so that the mapped sequences of pulse coefficients have a greater separation from one another.

In the present invention, receivers use a sequence detection to decode a transmitted signal rather than a pulse by pulse decoding scheme.

Various changes and modifications, other than those described above in the preferred embodiment of the invention described herein will be apparent to those skilled in the art. While the invention has been described with respect to certain preferred embodiments and exemplifications, it is not intended to limit the scope of the invention thereby, but solely by the claims appended hereto.

What is claimed is:

1. A communication encoding/decoding system for the use in transmission of wired or wireless signals, said communication system comprising:
   a transmitter having a memory which stores a plurality of pulse coefficients, said transmitter also including a multiplier and modulator;
   an input means for inputting at least one digital bit sequence into said transmitter;
   a microprocessor disposed within said transmitter which selects and transmits at least one of said stored pulse coefficients to said multiplier in response to said at least one digital bit sequence;
   pulse shape generation means disposed within said transmitter which transmits at least one pulse shape to said multiplier in response to said at least one digital bit sequence, wherein said at least one pulse shape and said at least one transmitted pulse coefficient are multiplied, and wherein said multiplied pulse shape is transmitted to said modulator where said multiplied pulse shape is modulated and then transmitted;
   a receiver having a demodulator for receiving and demodulating said transmitted pulses;
   a memory disposed within said receiver for storing said plurality of pulse sequences and a plurality of corresponding pulse coefficients;
   an amplitude differential determination means for determining a difference in value of the amplitude of said demodulated pulses to a subset of a plurality of stored pulse sequences;
   summing means for summing the amplitude differential values of the difference in values of the amplitudes of said demodulated pulses to each of said subset of stored pulse sequences, respectively;
   comparing means for comparing the summed absolute difference values corresponding to each of said subset of said stored pulse sequences;
   a first selecting means for selecting one of said subset of stored pulse sequences;
   corresponding to a stored pulse sequence having the lowest summed absolute difference value;
   a second selecting means for selecting a sequence of pulse coefficients corresponding to the selected pulse sequence; and
   mapping means for mapping the selected sequence of pulse coefficients to a digital bit sequence that is identical to said at least one digital input bit sequence.

2. The system of claim 1, further including a microprocessor in said receiver further includes a pulse sequence preselection subset means which selects a subset of said plurality of stored pulse sequences for absolute determination means, said pulse sequence preselection means being responsive to the number of pulses in said demodulated signal.

3. The system of claim 1, further including a microprocessor in said receiver which includes an algorithm that optimizes the stored plurality of sequences of pulse coefficients by selecting a finite number of sequences of pulse coefficients from a set of possible sequences of pulse coefficients, wherein said set of sequence of possible pulse coefficients has more possibilities than the selected finite number of sequences of pulse coefficients.

4. The system of claim 3, wherein said algorithm includes a pulse sequence coefficient deselection means which eliminates at least one of said possible sequence of pulse coefficients responsive to a portion of coefficient sequences of said at least one of said possible sequence of pulse coefficients.

5. The system of claim 3, wherein said algorithm includes a distance optimization determination means which optimizes the distance between said selected finite number of sequence of pulse coefficients.

6. The system of claim 3, wherein said algorithm includes a preliminary selection means which selects a first subset of possible sequences of pulse coefficients from the set of possible sequence of pulse coefficients, wherein said preliminary selection means is responsive to a number of bits of said digital signal input.

7. The system of claim 1, further including a microprocessor in said transmitter which includes an algorithm that includes a pulse sequence coefficient deselection means which eliminates at least one of said possible sequence of pulse coefficients responsive to a portion of coefficient sequences of said at least one of said possible sequence of pulse coefficients.

8. The system of claim 7, wherein said algorithm includes a distance optimization determination means which optimizes the distance between said selected finite number of sequence of pulse coefficients.

9. The system of claim 8, wherein said algorithm includes a preliminary selection means which selects a first subset of possible sequence of pulse coefficients from the set of possible sequence of pulse coefficients, wherein said preliminary selection means is responsive to a number of bits of said digital input.

10. A communication system for transmitting and receiving at least one digital signal, said system comprising:
   a transmitter;
   a microprocessor disposed within said transmitter, said microprocessor including an optimization algorithm which generates an optimal set of sequences of pulse coefficients responsive to a number of bits of said at least one digital signal being transmitted;
   selection means for selecting one of said optimal set of sequence of pulse coefficients responsive to the sequence of bits of said at least one digital signal being transmitted;
   a pulse shape generation means for generating a pulse shape responsive to the number of bits of said at least one digital signal being transmitted;
   a multiplier which multiplies the selected optimal set of pulse sequence coefficients by the pulse shape;
   a modulator disposed within said transmitter which modulates the multiplied pulse shape;
   transmission means for transmitting the modulated pulse shape;
   a receiver which receives and transmitted pulses;
   a demodulator disposed within said receiver which demodulates the received pulses;
   a microprocessor disposed within said receiver which includes said optimization algorithm which generates a set of optimal pulse sequences and corresponding set of sequence of pulse coefficients which are responsive to the number of pulses received at the receiver;
   a selection means for selecting one of said optimal set of pulse sequences and a corresponding sequence of pulse coefficients responsive to the demodulated received pulses; and
   mapping means for mapping the selected sequence of pulse coefficients in the receiver memory to a digital signal, wherein said signal is identical to said at least one digital signal that was transmitted.

11. The communication system of claim 10, further including a transmitter memory disposed within said transmitter for storing said optimal set of sequence of pulse coefficients and a receiver memory disposed within said receiver for storing said set of optimal pulse sequences and said corresponding set of sequence of pulse coefficients.

12. The communication system of claim 10, wherein said selection means further includes
summing means for summing the absolute values of the difference in values of the amplitudes of said demodulated pulses to each pulse of said set of optimal pulse sequences, respectively;
comparing means for comparing the summed absolute difference values corresponding to each of said set if optimal pulse sequences, respectively;
selecting mean for selecting one of said set of optimal pulse sequences and said corresponding sequence of pulse coefficients corresponding to a stored pulse sequence having the lowest summed absolute difference value.

13. The communication system of claim 10, wherein said microprocessor in said transmitter further includes an algorithm that includes a pulse sequence coefficient deselection means which eliminates at least one of said possible sequence of pulse coefficients responsive to a portion of coefficient sequences of said at least one of said possible sequence of pulse coefficients, and wherein said algorithm further includes a distance optimization determination means which optimizes the distance between said selected finite number of sequence of pulse coefficients.

14. The communication system of claim 10, wherein the microprocessor in said receiver further includes an algorithm that includes a pulse sequence coefficient deselection means which eliminates at least one of said possible sequence of pulse coefficients responsive to a portion of coefficient sequences of said at least one of said possible sequence of pulse coefficients, said algorithm further includes a distance optimization determination means which optimizes the distance between said selected finite number of sequence of pulse coefficients.

15. The communication system of claim 14, wherein said algorithm includes a preliminary selection means which selects a first subset of possible sequence of pulse coefficients from the set of possible sequence of pulse coefficients, wherein said preliminary selection means is responsive to a number of bits of said digital signal input.

16. A method of transmitting at least one digital bit sequence between a transmitter and a receiver, said method comprising the steps of:
Selecting and storing a plurality of sequences of pulse coefficients corresponding to a plurality of possible input bit sequences to a transmitter memory, wherein said at least one digital bit sequence is one of said possible input bit sequences, wherein each of said plurality of pulse sequence coefficients includes at least two coefficients;
inputting said at least one digital bit sequence to a transmitter;
selecting one of said plurality of sequence of pulse coefficients corresponding to said at least one input bit sequence;
multiplying said selected sequence of pulse coefficients by a predetermined pulse shape;
modulating said multiplied pulse shape;
transmitting said modulated pulse shape to a receiver;
determining and storing said plurality of sequences of pulse coefficients and corresponding plurality of pulse sequences in a receiver memory;
receiving said transmitted pulses;
demodulating said received pulses;
determining the absolute value of the difference between the value of the demodulated pulses and a select set of said plurality of pulse sequences;
summing the absolute value of the differences for each of said demodulated pulse shapes and each of said select set of pulse sequences so that each of said plurality of pulse sequences of said selected set corresponds to a unique sum;
comparing the unique sums;
selecting the unique sum having the lowest absolute value and the corresponding pulse sequence and corresponding sequence of pulse coefficients to said selected unique sum; and
mapping said corresponding sequence of pulse coefficients to a digital bit sequence which is identical to said at least one input bit sequence.

17. The method of claim 16, wherein the step of determining the absolute value of the difference between the value of the demodulated pulses and a select set of said plurality of pulse sequences, further includes the step of preselecting said subset of pulse sequences from a plurality of pulse sequences, said preselecting responsive to a number of pulses that were demodulated.

18. The method of claim 16, wherein the step selecting and storing a plurality of sequences of pulse coefficients corresponding to a plurality of possible input bit sequences to a transmitter memory further includes the steps of predetermining a finite set of possible sequences of pulse coefficients, deselecting at least one of said possible sequence of pulse coefficients responsive to a portion of coefficient sequences of said at least one of said possible sequence of pulse coefficients and optimizing the distance between non-deselected sequences of pulse coefficients.

19. The method of claim 16, wherein the step determining and storing said plurality of sequences of pulse coefficients and corresponding plurality of pulse sequences in a receiver memory further includes the steps of predetermining a finite set of possible sequences of pulse coefficients, deselecting at least one of said possible sequence of pulse coefficients responsive to a portion of coefficient sequences of said at least one of said possible sequence of pulse coefficients and optimizing the distance between non-deselected sequences of pulse coefficients, and the step of determining said corresponding plurality of pulse sequences from said plurality of sequence of pulse coefficients.

20. An encoder/decoder submodule for a communications system, wherein said communications system includes a transmitter having a modulator which sends a modulated signal responsive to a digital signal input and a receiver having a demodulator which demodulates said modulated signal, said submodule comprising:
a first memory disposed in said transmitter which stores a plurality of sequences of pulse coefficients;
a second memory in said receiver which stores said plurality of sequences of pulse coefficients and a corresponding plurality of pulse sequences;
a first software program disposed in said transmitter which maps said digital signal input to one of said plurality of sequences of pulse coefficients; and
a second software program disposed in said receiver which selects one of said plurality of pulse sequences responsive to said demodulated signal, said second software program further selecting a sequence of pulse coefficients at said receiver corresponding to said selected pulse sequence, wherein said selected sequence of pulse coefficients at both the receiver and the transmitter are identical, and then the maps said selected sequence of pulse coefficients at said receiver to a digital signal being the same signal as the digital signal input.

21. The submodule of claim 20, wherein said software program disposed in said receiver further includes absolute value determination means for determining the absolute value of the difference between each pulse of said demodulated signal and each pulse of a selected set of said plurality of pulse sequences, said software program further includes storage and summing means for storing the absolute values of the differences between said each of pulse of said demodulated signal and each pulse of a selected set of said plurality of pulse sequences and then summing the absolute values of corresponding difference of each pulse of said selected set of plurality of pulse sequences, said software program further including comparator means for comparing each of the summed absolute values, and said software program further including selection means for selecting one of said pulse sequences and a corresponding sequence of pulse coefficients that corresponds to the minimum absolute value as determined by the comparator means.

22. The submodule of claim 20, wherein said software program in said receiver further includes a pulse sequence preselection subset means which selects a subset of said plurality of said pulse sequences for absolute determination means, said pulse sequence preselection means being responsive to the number of pulses in said demodulated signal.

23. The submodule of claim 20, wherein said software programs in said transmitter and said receiver each includes predetermining means for predetermining a finite set of possible sequences of pulse coefficients responsive to the number of bits in said digital input signal, deselecting means for deselecting at least one of said possible sequence of pulse coefficients responsive to a portion of coefficient sequences of said at least one of said possible sequence of pulse coefficients and optimization means for optimizing the distance between non-deselected sequences of pulse coefficients.

* * * * *